they are attached form a piperidino or morpholino ring;
$R^5$ is $C_1-C_6$ alkyl or benzyl; and
$n$ is an integer of 2 to 3, and the acid addition salts thereof.

Thus, when Z is nitrogen, the compound is a novel 1,2,4-triazine. When Z is C—$R^2$ the compound is a pyridazine. When Z is nitrogen the triazine is substituted in the 3 and 6 positions with an alkoxycarbonyl or carboxamido group. When the compound is a pyridazine the 3 and 6 substituents may be phenyl in addition to the groups described above.

The value of $R^1$ varies depending upon the value of Z. For example, when the compound is a pyridazine, $R^1$ is an alkyl, alkoxy, hydroxyalkoxy, hydroxyalkyl, or amino group. When the compound is a triazine, $R^1$ is an alkyl or phenyl group. When $R^1$ is hydroxyalkyl it is possible for it to react with the carboxylic ester in the 6-position to form a lactone.

When our novel compound is a pyridazine the carbon atom in the 4-position of the ring may be unsubstituted or substituted with a $C_1-C_6$ alkyl group. When $R^1$ is amino it is dialkylamino or a cyclic amino such as piperidino or morpholino.

Examples of $C_1-C_6$ alkyl groups include methyl, ethyl, isobutyl, 3-methylbutyl and n-hexyl. Examples of $C_1-C_6$ alkoxy groups include methoxy, ethoxy, n-butoxy and 3,3-dimethylbutoxy. Suitable hydroxyalkoxy groups are hydroxypropoxy and hydroxyethoxy. Examples of hydroxyalkyl groups are hydroxyethyl and hydroxypropyl.

The starting material for the preparation of our novel pyridazines and 1,2,4-triazines is an s-tetrazine of the formula

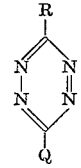

wherein R and Q are phenyl or alkoxycarbonyl. This tetrazine is reacted with a cyclic enol ether, an acetylenic amine, an acetylenic ether, a cyclic enol ester, or an imino ether as will be described in more detail below. The nature of the product obtained from the reaction is a function of the type compound reacted with the tetrazine.

Cyclic enol ethers which may be used in the preparation of the pyridazines are those having the formula

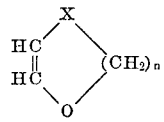

wherein X is oxygen or a methylene group and $n$ is 2 or 3. The use of a cyclic enol ether of this type results in the formation of a pyridazine wherein $R^1$ in the above formula is hydroxyalkyl or hydroxyalkoxy, depending upon whether X is a methylene group or oxygen.

Acetylenic amines and ethers are compounds of the formula

wherein $Q^1$ is $C_1-C_6$ alkoxy or $N(R^4)_2$ and $Q^2$ is hydrogen or $C_1-C_6$ alkyl. The product from this reaction is a pyridazine wherein $R^1$ in the above formula is a $C_1-C_6$ alkoxy group or an amino group of the formula $N(R^4)_2$ and $R^2$ in the above formula is a hydrogen or a $C_1-C_6$ alkyl group.

A suitable cyclic enol ester is one having the formula

3,644,358
ANTI-INFLAMMATORY 1,2,4-TRIAZINES
Patrick Roffey, Camberley, and John Pomfret Verge, Henley-on-Thames, England, assignors to Lilly Industries, Ltd., London, England
No Drawing. Filed Jan. 14, 1970, Ser. No. 2,934
Claims priority, application Great Britain, Jan. 21, 1969, 3,364/69
Int. Cl. C07d 51/04, 55/10
U.S. Cl. 260—248 AS                                      3 Claims

ABSTRACT OF THE DISCLOSURE

A series of substituted pyridazines and 1,2,4-triazines having anti-inflammatory activity is described. These compounds are prepared from 3,6-disubstituted-s-tetrazines by treatment with a cyclic enol ether, an acetylenic amine, an acetylenic ether, a cyclic enol ester, or an imino ether.

BACKGROUND OF THE INVENTION

It is known to react s-tetrazines with acyclic enol ethers and enamines, however, their reaction with cyclic enol ethers, acetylenic amines, acetylenic ethers, or cyclic enol esters to give novel substituted pyridazines have not previously been described. Further, tetrazines have not been previously reacted with imino ethers to yield the novel 1,2,4-triazines described herein.

SUMMARY

We have now discovered that novel pyridazines having anti-inflammatory activity are obtained by treating a 3,6-disubstituted-s-tetrazine with a cyclic enol ether, an acetylenic amine, an acetylenic ether, or a cyclic enol ester when the 3 and 6 substituents are a phenyl group or an alkoxycarbonyl group. In addition, novel 1,2,4-triazines having anti-inflammatory activity are obtained when a 3,6-disubstituted-s-tetrazine is treated with an imino ether when the 3 and 6 substituents are an alkoxycarbonyl group. This method of preparing 1,2,4-triazines is a novel synthetic method not previously described.

DESCRIPTION OF THE PREFERRED EMBODIMENT

The novel pyridazines and triazines of our invention are those having the following formula

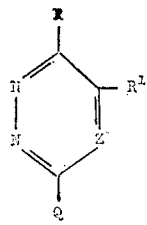

wherein:

Z is nitrogen or C—$R^2$;

each of R and Q is

or, when Z is C—$R^2$, phenyl;

$R^1$, when Z is C—$R^2$, is $C_1-C_6$ alkyl, $C_1-C_6$ alkoxy, $O(CH_2)_nOH$, $(CH_2)_nOH$, $N(R^4)_2$, or, when Z is nitrogen, is $C_1-C_6$ alkyl or phenyl; or R and $R^1$ taken together with the ring carbon atoms to which they are attached form a lactone;

$R^2$ is hydrogen or $C_1-C_6$ alkyl;

$R^3$ is $C_1-C_6$ alkoxy or $NHR^5$;

each $R^4$ separately is $C_1-C_6$ alkyl or the two taken together with the nitrogen to which

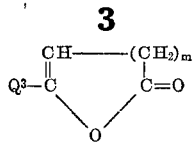

wherein $Q^3$ is hydrogen or $C_1$–$C_6$ alkyl and $m$ is 1 or 2. This reaction results in the preparation of a pyridazine wherein $R^1$ is a $C_1$–$C_2$ alkyl group and $R^2$ is hydrogen or a $C_1$–$C_6$ alkyl group.

Reactions of the type we have described are known although they have not been used heretofore to prepare novel pyridazines of the type described herein. These reactions are run at temperatures within the range of about 0° to 100° C., and preferably within the range of about 20° to about 80° C. The reaction is preferably carried out in an inert organic solvent such as benzene, toluene, dioxane, or tetrahydrofuran. Reaction times vary from about 15 minutes to several days depending upon the reagents employed and the temperature of the reaction.

In addition to preparing novel pyridazines, we have found a novel method for the preparation of 1,2,4-triazines which also have anti-inflammatory activity. This novel synthetic method involves the treatment of a tetrazine of the formula given above wherein R and Q are alkoxycarbonyl with an imino ether having tthe formula

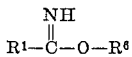

wherein $R^1$ is $C_1$–$C_6$ alkyl or phenyl and $R^6$ is $C_1$–$C_6$ alkyl. The product of this reaction is a 1,2,4-triazine of the above formula wherein Z is nitrogen, R and Q are alkoxycarbonyl, and $R^1$ is $C_1$–$C_6$ alkyl or phenyl.

Our synthesis of the triazines is conducted at a temperature of 0 to 100° C., preferably at 20° to 80° C., for a period of from about 15 minutes to several days. The reaction is preferably conducted in an inert solvent such as benzene, toluene, dioxane, or tetrahydrofuran.

Once the pyridazines and triazines have been prepared the alkoxycarbonyl group can be converted to a carboxamido group by procedures well known to those skilled in the art.

It is to be understood that those compounds of our invention wherein $R^1$ is hydroxyalkyl or hydroxyalkoxy may be converted to the corresponding esters using common esterification procedures. It is to be further understood that acid addition salts may be obtained from those compounds of our invention containing basic amino groups in the molecule. Such acid addition salts may be obtained by treatment of the amine with acids such as hydrochloric acid, sulfuric acid, acetic acid, propionic acid and phosphoric acid.

The following examples further illustrate the preparation of the compounds of our invention. The toluene and dioxane used were freshly distilled, the latter from sodium pellets. Molecular weights were determined on an A.E.I.M.S. 9 mass spectrometer.

EXAMPLE 1

3,6-diphenyl-4-(2'-hydroxyethoxy)pyridazine

To a solution containing 4 g. of 3,6-diphenyltetrazine and a trace of hydroquinone in 60 ml. of dry toluene was added 9 g. of dioxene. The solution was heated under reflux for two weeks when a thin layer chromatography examination on silica gel using a mixture of benzene/ethyl acetate (2:8) as the developing agents indicated the absence of starting tetrazine. On allowing the reaction mixture to cool, colorless crystals of 3,6-diphenyl-4-(2'-hydroxyethoxy)pyridazine separated which were removed by filtration, washed with a little toluene and dried.

Yield: 4.3 g. (78%); melting point 154–155° C.
Analysis: 73.8% C, 5.8% H, 9.5% N.
Calculated for $C_{18}N_{16}N_2O_2$: 74.0% C, 5.5% H, 9.6% N.

EXAMPLE 2

3,6-diphenyl-4-(2'-acetoxyethoxy)pyridazine

A solution containing 1 g. of 3,6-diphenyl-4-(2'-hydroxyethoxy)pyridazine, 4 ml. of pyridine and 8 ml. of acetic anhydride was heated at 90° C. for 3 hours. Removal of the solvent in vacuo and trituration of the resultant oil with ether gave 3,6-diphenyl-4-(2'-acetoxyethoxy)pyridazine as a colorless crystalline solid.

Yield: 800 mg. (70%); melting point 116–118° C.
Analysis: 72.5% C, 5.8% H, 8.3% N.
Calculated for $C_{20}H_{18}N_2O_3$: 72.1% C., 5.4% H, 8.4% N.

A solution containing 200 mg. of 3,6-diphenyl-4-(2'-acetoxyethoxy)pyridazine in 10 ml. of ethanol and 5 ml. of 5 N sodium hydroxide was heated under reflux for 3 hours. After cooling and dilution with 50 ml. of water the resultant white precipitate was extracted into 50 ml. of chloroform. Evaporation of the organic layer in vacuo and trituration of the residue with isopropanol gave 1000 mg. of crystalline material, M.P. 148–151° C. Recrystallization from benzene gave 54 mg. of pure hydrolysis product, M.P. 154–155° C. which was indistinguishable from 3,6-diphenyl-4-(2' - hydroxyethoxy)-pyridazine by thin layer chromatography, by I.R., U.V. or N.M.R. spectroscopy or by a mixed melting point determination.

EXAMPLE 3

3,6-diphenyl-4-(3'-hydroxypropyl)pyridazine tetrahydropyranyl ether

To a solution containing 5 g. of 3,6-diphenyltetrazine and a trace of hydroquinone in 75 ml. of dry toluene was added 15 ml. of 2,3-dihydropyran. The mixture was heated under reflux for 48 hours and evaporated in vacuo to give 6.8 g. of a straw colored oil which crystallized on standing.

Recrystallization from ether gave pure 3,6-diphenyl-4-(3'-hydroxypropyl)pyridazine tetrahydropyranyl ether.

Yield: 5.5 g. (71%); melting point 104° C.
Analysis: 77.4% C., 6.9% H, 7.5% N; M, 374.
Calculated for $C_{24}H_{26}N_2O_2$: 77.1% C, 7.0% H, 7.5% N; M, 374.

When a solution containing 1.07 g. (0.05 mole) of 3,6-diphenyltetrazine and 0.45 g. (0.05 mole) of 2,3-dihydropyran in 15 ml. of toluene was heated under reflux for three weeks the only compounds which could be isolated were 3,6-diphenyl-4-(3' - hydroxypropyl)pyridazine (ca. 25% yield) and unreacted 3,6-diphenyltetrazine.

EXAMPLE 4

3,6-dicarbomethoxy-4-(2'-hydroxyethoxy)pyridazine

To a solution containing 4 g. of 3,6-dicarbomethoxytetrazine in 80 ml. of dry dioxane was added 2.4 g. of dioxene at room temperature. The mixture was stirred and the temperature increased to 60° C., when effervescence of nitrogen commenced. After 30 minutes at this temperature the solution was light straw colored and the evolution of nitrogen ceased. Removal of the solvent in vacuo and trituration of the resultant oil with ether gave a crystalline solid, recrystallization of which from isopropanol gave 3,6-dicarbomethoxy-4-(2'hydroxyethoxy)-pyridazine.

Yield 4.1 g. (80%); melting point 109° C.
Analysis: 46.6% C., 4.7% H, 11.0% N.
Calculated for $C_{10}H_{12}N_2O_6$: 46.9% C, 4.7% H, 10.9% N.

EXAMPLE 5

3,6-dicarbomethoxy-4-(3'-hydroxypropyl)pyridazine

To a stirred solution containing 2 g. of 3,6-dicarbomethoxytetrazine in 50 ml. of dry dioxane was added 1.2 g. of 2,3-dihydropyran. An immediate exothermic reaction commenced with concomitant evolution of nitrogen and after 2 hours the solution appeared almost colorless.

After standing overnight at room temperature the solvent was removed in vacuo to give 3 g. of a light yellow oil which on trituration with ether gave 3,6-dicarbomethoxy-4-(3'-hydroxypropyl)pyridazine as a colorless crystalline solid.

Yield: 2.1 g. (80%); melting point 72–74° C.
Analysis: 52.1% C, 5.9% H, 11.1% N.
Calculated for $C_{11}H_{14}N_2O_5$: 52.0% C, 5.6% H, 11.0% N.

EXAMPLE 6

3,6-dicarbomethoxy-4-(3'-acetoxypropyl)pyridazine

A solution containing 400 mg. of 3,6-dicarbomethoxy-4-(3'-hydroxypropyl)pyridazine, 2 ml. of pyridine and 5 ml. of acetic anhydride was heated at 90° C. for 3 hours. Removal of the solvents in vacuo gave an oil which was extracted into 20 ml. of dichloromethane, washed with aqueous bicarbonate, water, and dried ($MgSO_4$). T.L.C. of this solution on silica gel using a mixture of benzene/ethyl acetate (2:8) as the developing agents indicated the absence of starting alcohol and the presence of only one reaction product ($R_F$ 0.75). Removal of the solvent gave 3,6-dicarbomethoxy-4-(3'-acetoxypropyl)pyridazine as a colorless oil.

Yield: 310 mg. (70%).
M (found 296.1008; $C_{13}H_{10}N_2O_6$ requires M 296.1008.

EXAMPLE 7

3,6-dicarbomethoxy-4-methyl-5-(N,N-diethylamino) pyridine hydrochloride.

To a solution containing 4 g. of 3,6-dicarbomethoxytetrazine in 75 ml. of dry dioxane at room temperature was slowly added a solution of 3 g. of 1-(N,N-diethylamino)prop-1-yne in 25 ml. of dioxane. An immediate exothermic reaction occurred and after 2 hours the solvent was removed in vacuo to give 6.5 g. of a yellow oil. This was dissolved in 100 ml. of dry ether and ethereal HCl added dropwise until precipitation of the hydrochloride was complete. Crystallization from iso-propanol/ether gave pure 3,6-dicarbomethoxy-4-methyl-5-(N,N-diethylamino)pyridazine hydrochloride.

Yield: 5.4 g. (73%); melting point 98–101° C. (decomposed).
Analysis: 49.6% C, 6.5% H, 13.2% N.
Calculated for $C_{13}H_{20}N_3O_4Cl$: 49.2% C, 6.1% H. 13.2% N.

EXAMPLE 8

3,6-diphenyl-4-methyl-5-(N,N-diethylamino)pyridazine

To a solution containing 5 g. of 3,6-diphenyltetrazine in 60 ml. of dry toluene was added 4 g. of 1-(N,N-diethylamino)-prop-1-yne. After heating under reflux for 15 minutes evolution of nitrogen ceased and the solution became light yellow. Removal of the solvent in vacuo gave an oil which solidified on trituration with ether. Crystallization from iso-propanol gave 3,6-diphenyl-5-methyl-5-(N,N-diethylamino)pyridazine as colorless needles.

Yield: 4.8 g. (65%); melting point 120–121° C.
Analysis: 79.7% C, 7.4% H, 13.4% N.
Calculated for $C_{21}H_{23}N_3$: 79.4% C, 7.4% H, 13.3% N.

EXAMPLE 9

3,6-dicarbomethoxy-4-ethoxypyridazine

To a solution containing 1 g. of 3,6-dicarbomethoxytetrazine in 15 ml. of dry dioxane was added 0.4 g. of ethoxyacetylene in 5 ml. of dry dioxane. The solution was kept at 45° C. for 3 hours and finally heated under reflux for 30 minutes. Removal of the solvent gave a light orange oil which crystallized on standing. Recrystallization from iso-propanol/petroleum ether (B.P. 40°–60°) gave 3,6-dicarbomethoxy-4-ethoxypyridazine.

Yield: 700 mg. (63%); melting point 72–75° C.

EXAMPLE 10

3,6-dicarbomethoxy-4-methyl-5-(2'-hydroxyethyl) pyridazine

To a solution containing 5 g. of 3,6-dicarbomethoxytetrazine in 80 ml. of dioxane was added a solution of 2.4 g. of 5-methyl-2,3-dihydrofuran in 24 ml. of dioxane. After the initial exothermic reaction had subsided the mixture was warmed to 85° C. for 2½ hours. Removal of the solvent in vacuo gave an oil which solidified on trituration with ether. Pure 3,6-dicarbomethoxy-4-methyl-5-(2'-hydroxyethyl)pyridazine was obtained by crystallization from methanol/ether.

Yield: 4.9 g. (77%), melting point 105–107° C.
Analysis: 52.2% C, 5.6% H, 11.2% N.
Calculated for $C_{11}H_{14}N_2O_5$: 52.0% C, 5.6% H, 11.0% N.

EXAMPLE 11

3,6-dicarbomethoxy-4,5-dimethylpyridazine

To a solution containing 1 g. of 3,6-dicarbomethoxytetrazine in 15 ml. of dioxane was added a solution of 0.6 g. of angelica lactone in 5 ml. of dioxane. The mixture was heated at between 60–70° C. for 4 hours and the solvents removed in vacuo to give 1.5 g. of a yellow oil. Trituration with isopropanol gave 400 mg. of a crystalline product, M.P. 85–90° C. Recrystallization from iso-propanol (with charcoaling) gave colorless needles of 3,6-dicarbomethoxy-4,5-dimethylpyridazine.

Yield: 200 mg. (18%); melting point 101–102° C.
Analysis: 53.6% C, 5.0% H, 12.6% N; M 224.
Calculated for $C_{10}H_{12}N_2O_4$: 53.6% C, 5.4% H, 12.5% N; M 224.

EXAMPLE 12

3,6-dicarbomethoxy-5-methyl-1,2,4-triazine

To a stirred solution containing 5 g. of 3,6-dicarbomethoxytetrazine in 75 ml. of dioxane was slowly added 2.25 g. of ethyl acetimidate in 25 ml. of dioxane at room temperature. The mixture was then stirred at 60° C. for 10 hours when the color had changed to yellow-green. A T.L.C. examination on silica gel using a mixture of benzene/ethyl acetate (2:8) as the developing agents indicated the presence of one major reaction product, $R_F$ 0.8. Removal of the solvent in vacuo gave 5.1 g. of an oil which was chromatographed on a column (80×3 cm.) of silica gel (100–200 mesh). Initial development with a mixture of ethyl acetate/benzene (2:3) eluted a bright yellow impurity. The major reaction product was eluted as a light yellow band using a mixture of ethyl acetate/benzene (1:1) as eluant. Removal of the solvents from this fraction gave an oil which on trituration with cold ether gave 3,6-dicarbomethoxy-5-methyl-1,2,4-triazine as a light yellow crystalline solid.

Yield: 630 mg. (13%); melting point 82–83° C.
Analysis: 45.4% C, 4.5%; H, 20.0% N; M 211.
Calculated for $C_8H_9N_3O_4$: 45.5% C, 4.3% H, 19.9% N; M 211.

EXAMPLE 13

3,6-dicarbomethoxy-5-phenyl-1,2,4-triazine

A stirred solution of 1 g. of 3,6-dicarbomethoxytetrazine and 0.75 g. ethyl benzimidate in 15 ml. of dioxane was kept at 80° C. for 6 hours. Removal of the solvent gave a yellow oil which was chromatographed on a column (35×3 cm.) of silica gel (100–200 mesh). Development with a mixture of ethyl acetate/benzene (2:3) eluted a yellow band which was collected and on evaporation of the solvents gave an oil. Trituration with ether gave 3,6-dicarbomethoxy-5-phenyl-1,2,4-triazine as yellow plates.

Yield: 190 mg. (27%); melting point 110–113° C.
Analysis: 57.3% C, 4.1% H, 15.6% N; M, 273.

Calculated for $C_{13}H_{11}N_3O_4$: 57.2% C, 4.1% H, 15.4% N; M, 273.

EXAMPLE 14

3-oxo-7-methyl-8-carbomethoxy-5,6-dihydropyrano-[3,4c]pyridazine

A solution of 200 mg. of 3,6-dicarbomethoxy-4-methyl-5-(2'-hydroxyethyl)pyridazine in 15 ml. of dry methanol was saturated with HCl gas and heated under reflux for 15 minutes. The solvent was removed in vacuo and the resultant oil crystallized from iso-propanol to give 3-oxo-7-methyl - 8 - carbomethoxy - 5,6 - dihydropyrano[3,4c]pyridazine as colorless needles.

Yield: 170 mg. (96%); melting point 161–163° C.
Analysis: 54.1% C, 4.7% H, 12.6% N.
Calculated for $C_{10}H_{10}N_2O_4$: 54.1% C, 4.5% H, 12.6% N.

The novel compounds of our invention exhibited anti-inflammatory activity. They may be formulated in dosage forms for both oral and parenteral administration. The formulation of compounds exhibiting such activity in association with pharmaceutical carriers or diluents is well known.

Solid dosage forms for oral administration include capsules, tablets, pills, powders and granules. In such solid dosage forms the active compound is admixed with at least one inert diluent such as sucrose, lactose, or starch. Such dosage forms can also contain additional substances other than inert diluents, for example, lubricating agents such as magnesium stearate. In the case of capsules, tablets and pills the dosage forms may also contain buffering agents. Tablets and pills can additionally be prepared with enteric coatings.

Liquid dosage forms for oral administration include pharmaceutically acceptable emulsions, solutions, suspensions, syrups and elixirs containing inert diluents commonly used in the art, such as water. Besides inert diluents, such compositions can also include adjuvants such as wetting agents, emulsifying and suspending agents, and sweetening, flavoring and perfuming agents.

Preparations according to this invention for parenteral administration include sterile aqueous or nonaqueous solutions, suspensions, or emulsions. Examples of nonaqueous solvents or vehicles include propylene glycol, polyethylene glycol, vegetable oils such as olive oil, and injectable organic esters such as ethyl oleate. Such dosage forms may also include adjuvants such as preserving, wetting, emulsifying, and dispersing agents. They may also be manufactured in the form of sterile solid compositions which can be dissolved in sterile water or some other sterile injectable medium immediately prior to use.

The dosage of active ingredient to be administered varies with the degree of activity of the compound being employed. Generally, dosage levels of 50 to 150 mg./kg. of body weight are administered to mammals from one to three times daily to obtain effective relief of inflammation, pain and fever.

The anti-inflammatory activity of a representative number of compounds of our invention was demonstrated in the well-known carrageenin test wherein the measure of activity is the reduction in swelling of an inflamed mouse paw. A reduction of 20% or better is considered to be significant in this test. The results of the test are shown in the following table. In each test the animal was given two doses at the level indicated. Administration was oral.

| Compound | Dosage, mg./kg. | Percent reduction |
|---|---|---|
| 3,6-dicarbomethoxy-5-methyl-1,2,4-triazine | 100 | 37 |
| 3,6-diphenyl-4-(2'-hydroxyethoxy)pyridazine | 100 | 32 |
| 3,6-bis(N-benzylcarboxamido)-4-(3'-hydroxypropyl)pyridazine | 50 | 25 |
| 3,6-diphenyl-4-methyl-5-(N,N-diethylamino)pyridazine | 100 | 38.5 |

We claim:
1. A compound selected from the group consisting of a compound of the formula:

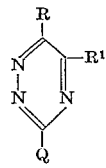

wherein
each of R and Q is

$R^1$ is $C_1$–$C_6$ alkyl or phenyl; or
R and $R^1$ taken together with the ring carbon atoms to which they are attached from a lactone;
$R^3$ is $C_1$–$C_6$ alkoxy or $NHR^5$;
$R^5$ is $C_1$–$C_6$ alkyl or benzyl;
and the pharmacologically acceptable acid addition salts thereof.

2. A compound as in claim 1 wherein R is

and $R^1$ is methyl.

3. A method for the preparation of 1,2,4-triazine having the formula

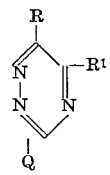

which comprises treating a 3,6-disubstituted-s-tetrazine having the formula

with an imino ether having the formula

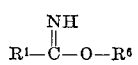

at a temperature within the range of 0° to 100° C., wherein in the formulas
R and Q are

$R^1$ is $C_1$–$C_6$ alkyl or phenyl;
$R^3$ is $C_1$–$C_6$ alkoxy; and
$R^6$ is $C_1$–$C_6$ alkyl.

References Cited

UNITED STATES PATENTS 3,428,635  2/1969  Trepanier et al. _____ 260—248

JOHN M. FORD, Primary Examiner

U.S. Cl. X.R.

260—250 A, 247.5 R; 124—249; 250